A packet interceptor monitors GTP traffic for control signaling and data plane traffic. The interceptor reroutes a packet by modifying its IP addresses and forwards the packet to a packet data network gateway server. The server receives the GTP-U packet, performs identification based on the synchronized GTP session information, decapsulates the GTP tunnel information from the GTP-U packet and sends to either a proxy server or the destination application server directly. The proxy server performs message filtering, stores packet contents into storage and forwards the packet out to the destination application server. The filtering function of the proxy server can be trained and enhanced with machine learning algorithms. Thus, the proxy server can automatically detect the traffic type and allow or block the packet based on the detection result.

(12) United States Patent
Xu et al.

(10) Patent No.: US 10,412,049 B2
(45) Date of Patent: Sep. 10, 2019

(54) TRAFFIC REROUTING AND FILTERING IN PACKET CORE NETWORKS

(71) Applicant: Syniverse Technologies, LLC, Tampa, FL (US)

(72) Inventors: Huiyue Xu, Beijing (CN); Levens Li, Beijing (CN); Edward Yau, Tseung Kwan O (HK); Taiguo Zhang, Beijing (CN); Zhengchao Zhang, Xi'an (CN); Feng Yang, Xi'an (CN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/167,020

(22) Filed: Oct. 22, 2018

(65) Prior Publication Data
US 2019/0124043 A1 Apr. 25, 2019

Related U.S. Application Data

(60) Provisional application No. 62/575,130, filed on Oct. 20, 2017.

(51) Int. Cl.
H04L 29/06 (2006.01)
H04W 76/12 (2018.01)
H04W 76/11 (2018.01)
H04L 29/12 (2006.01)
G06N 20/00 (2019.01)

(52) U.S. Cl.
CPC ...... *H04L 63/0236* (2013.01); *H04L 61/1511* (2013.01); *H04L 63/029* (2013.01); *H04L 63/0281* (2013.01); *H04L 65/102* (2013.01); *H04W 76/11* (2018.02); *H04W 76/12* (2018.02); *G06N 20/00* (2019.01)

(58) Field of Classification Search
CPC ............ H04L 63/0236; H04L 61/1511; H04L 65/102; H04L 63/029; H04L 63/0281; H04W 76/12; H04W 76/11; G06N 20/00
See application file for complete search history.

(56) References Cited

U.S. PATENT DOCUMENTS

| 2011/0243065 | A1* | 10/2011 | Sarma | H04W 40/02 370/328 |
| 2016/0285763 | A1* | 9/2016 | Laxman | H04L 45/745 |
| 2017/0230832 | A1* | 8/2017 | Ophir | H04W 4/70 |

* cited by examiner

*Primary Examiner* — Shailendra Kumar
(74) *Attorney, Agent, or Firm* — Andriy Lytvyn; Smith & Hopen, P.A.

(57) ABSTRACT

18 Claims, 11 Drawing Sheets

Original DNS Response — 42

Answers
 clients4.google.com: type CNAME, class IN, cname clients.l.google.com
  Name: clients4.google.com
  Type: CNAME (Canonical NAME for an alias) (5)
  Class: IN (0x0001)
  Time to live: 125
  Data length: 12
  CNAME: clients.l.google.com
 clients.l.google.com: type A, class IN, addr 216.58.197.238
  Name: clients.l.google.com
  Type: A (Host Address) (1)
  Class: IN (0x0001)
  Time to live: 125
  Data length: 4
  Address: 216.58.197.238

System Generated DNS Response — 44

Answers
 clients4.google.com: type CNAME, class IN, cname gservice.syniverse.com
  Name: www.google.com
  Type: CNAME (Canonical NAME for an alias) (5)
  Class: IN (0x0001)
  Time to live: 752
  Data length: 21
  CNAME: gservice.syniverse.com
 gservice.syniverse.com: type A, class IN, addr 1.1.1.1
  Name: gservice.syniverse.com
  Type: A (Host Address) (1)
  Class: IN (0x0001)
  Time to live: 752
  Data length: 4
  Address: 1.1.1.1

*FIG. 6*

TRAFFIC REROUTING AND FILTERING IN PACKET CORE NETWORKS

PRIORITY CLAIM

This non-provisional application claims priority to a U.S. Provisional Application having Ser. No. 62/575,130 filed on Oct. 20, 2017.

BACKGROUND OF THE INVENTION

1. Field of the Invention

This invention relates generally to the field of telecommunications networks, specifically to the mobile packet core network in the General Packet Radio Service (GPRS) or 3G network, or the Evolved Packet Core (EPC) of the Long-Term Evolution (LTE) network.

More specifically, it relates to methods and systems of inspecting GTP traffic and directing the packets to a different packet gateway in the mobile core network, performing content screening and then relaying the packets to the final destinations.

2. Brief Description of the Related Art

In the mobile data network, once the data session is setup between the mobile device and core network systems, all the application traffic from the mobile device is routed through the same path from the Serving GPRS Support Node (SGSN) and/or serving gateway (SGW) to the Gateway General packet radio service Serving Node (GGSN) and/or Packet data network gateways (PGW). The application traffic then goes through different network routers and firewalls along the path prior to arriving at the final application servers running on the Internet. In one example, firewalls in the path inspect the traffic and may block certain traffic based on local regulation policy or security requirements.

However, with respect to application traffic using HTTPS, which is encrypted, the firewalls cannot differentiate the service types and then block all application traffic originating from the same destination. The inability to differentiate different types of traffic impacts the use of certain allowable services. One example is the GOOGLE services. The policy may require blocking the GOOGLE search traffic but allowing the GOOGLE Map service. However, all types of traffic to GOOGLE services are encrypted via HTTPS, so it is difficult for the firewall to support such policy. Therefore, specific application traffic must be rerouted to a different path, and a separate content filtering system must be implemented to fulfill the filtering requirement.

Another example is that with the increasing security concerns, certain companies need to separate device traffic and need specified application traffic to terminate directly inside the mobile core network without going through the public Internet. Internet of Thing (IoT) devices can provide multiple services. One service is to interconnect with the IoT management system, while another service allows the end user to access Internet for web browsing or video streaming. The first type of traffic has stricter security requirements and does not need to go through the Public Internet. Rerouting such traffic directly through the mobile core network based on application type is a viable solution that can be implemented on network side, without the need to modify or upgrade the IoT devices.

This invention discloses the methods and systems to resolve the above mentioned problems by intercepting and monitoring the control signaling and data packets between the Serving GPRS Support Node (SGSN) and/or serving gateway (SGW) and the Gateway General packet radio service Serving Node (GGSN) and/or Packet data network gateways (PGW), detecting the traffic type, directing the detected application packets to a different packet gateway, decapsulating the GTP-U tunnel, performing necessary filtering and packet inspection, and terminating the packets towards the actual destinations.

SUMMARY OF THE INVENTION

This invention pertains to networking and application systems that handle the data communications protocols GTP-C and GTP-U. A Packet Interceptor monitors the GTP traffic for both control signaling and data plane traffic. Once the Packet Interceptor detects the application traffic that needs to be rerouted, the Packet Interceptor modifies the corresponding packet's IP addresses and forwards the modified packet to a PGW Data Server. The PGW Data Server receives the GTP-U packet, performs packet identification based on the synchronized GTP Session information, then decapsulates the GTP tunnel information off the GTP-U packet and sends the packet either to a Proxy Server or the destination application server directly. The Proxy Server performs corresponding message filtering, stores packet's content into external data storage, and forwards it out to the destination application server. The filtering function of Proxy Server is also trained and enhanced with Machine Learning algorithm, which enables the Proxy Server to auto detect the traffic type, and allow or block the packet based on the detection result.

In an embodiment, the invention pertains to a system of routing traffic in a packet core network having a Serving General Packet Radio Service Serving (GPRS) Node (SGSN) or a Serving Gateway (S-GW) and a Gateway GPRS Serving Node (GGSN) or a Packet Data Network Gateway (P-GW). A Packet Interceptor is configured to access a GPRS Tunneling Protocol Control signaling (GTP-C) message sent between the SGSN/SGW and the GGSN/PGW. The Packet Interceptor obtains a Tunnel Endpoint Identifier (TEID) for the GTP-U tunnel between the SGSN/SGW and the GGSN/PGW. The Packet Interceptor then intercepts GPRS Tunneling Protocol data (GTP-U) packets sent from the SGSN/SGW toward the GGSN/PGW, wherein the GTP-U packet is encapsulated into the GTP-U tunnel having the TEID. Content information of the packet, session data, or packet handling statistic data is stored within a Content Storage.

A Proxy Server is provided in communication with a DNS server and an Application Server. The Proxy Server is configured to filter GTP-U traffic by monitoring the destination domains of upstream GTP-U packets sent from the UE.

A PGW Data Server communicates with Packet Interceptor and the Proxy Server. The PGW Data Server decapsulate the upstream GTP-U packets into an upstream Internet Protocol (IP) packets and sends the upstream IP packets to the Proxy Server or directly to a destination application server. When Proxy Server or the destination application server responds with a downstream IP packet, the PGW Data Server receives this IP packet and encapsulates it into a downstream GTP-U packet, wherein the second GTP-U packet is encapsulated into the GTP-U tunnel having the TEID, which the Packet Interceptor obtained from the GTP-C messaging between the SGSN/SGW and GGSN/PGW. After encapsulation, the PGW Data Server routes the downstream GTP-U packet toward the SGSN/SGW.

In an embodiment, prior to sending the upstream IP packet to the Proxy Server or the destination application server, the PGW Data server assigns a local subnet IP address to a UE and replaces, within the upstream IP packet, the UE IP address assigned by the GGSN/PGW with the local subnet IP address. Likewise, for downstream data packets, the PGW Data Server replaces the local subnet IP address assigned to the UE with the UE IP address assigned by the GGSN/PGW and then sends the downstream IP packet toward the SGSN/SGW. In this embodiment, mapping of the UE IP address assigned by the GGSN and the local subnet IP address is maintained.

In an embodiment, the network system involves GTP-U messages containing DNS packets directed toward a domain. The Packet Interceptor node is configured to intercept such GTP-U messages and to send a DNS response toward the SGSN/SGW pointing to the Proxy Server.

In an embodiment, the Proxy Server functions as a relay server. In this embodiment, the Proxy Server is configured to accept Transmission Control Protocol (TCP) connections, Secure Socket Layer (SSL) handshakes, Hyper Text Transfer Protocol (HTTP) requests, or a HTTP Secure (HTTPS) requests. The Proxy Server initiates a new HTTP or a new HTTPS request toward the destination application servers, and, responsive to receiving the downstream IP message from the destination application server, sends the downstream IP message toward the SGSN/SGW.

In an embodiment, IP address of the destination application server is superseded with the IP address of the Proxy Server. Thus, responsive to receiving an upstream IP message, the Proxy Server relays the upstream IP message to the GGSN//PGW.

BRIEF DESCRIPTION OF THE DRAWINGS

For a fuller understanding of the invention, reference should be made to the following detailed disclosure, taken in connection with the accompanying drawings, in which:

FIG. 6 is a block diagram depicting the differences of DNS response message between the original message and the one generated by an embodiment of the present invention.

DETAILED DESCRIPTION OF THE PREFERRED EMBODIMENT

Figure 1:
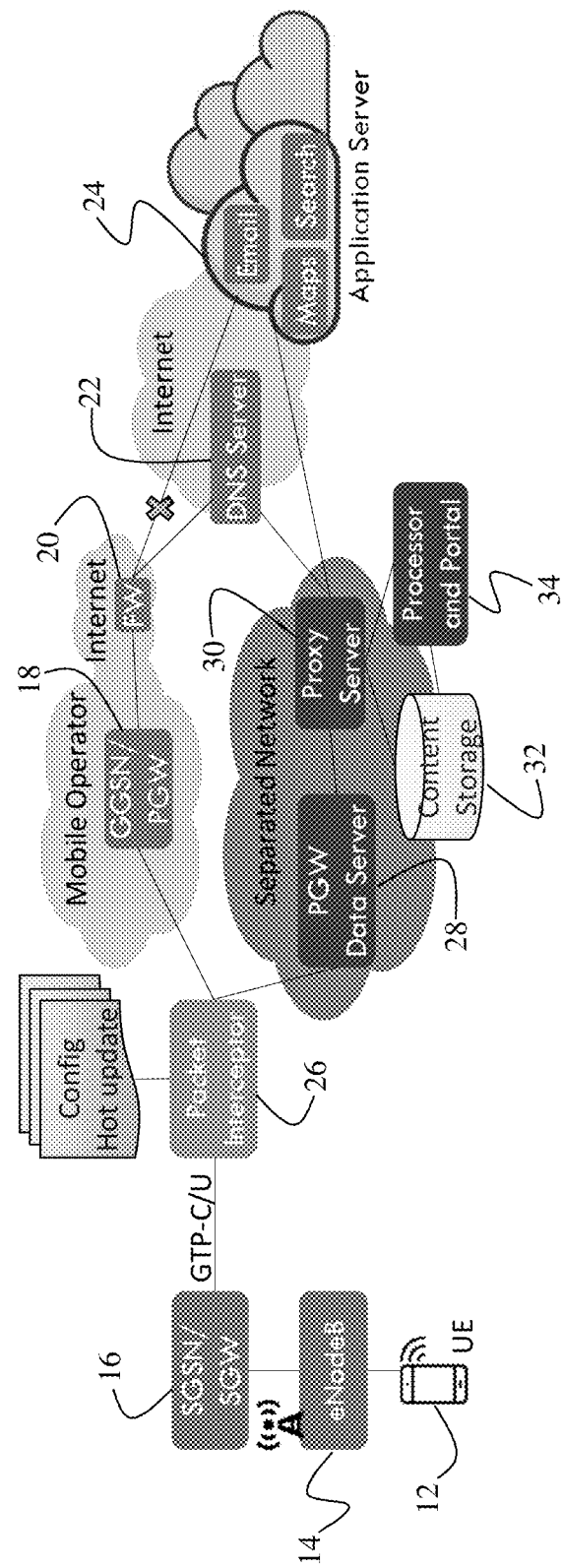
FIG. 1 is a block diagram schematically depicting the system architecture of an embodiment of the present invention.

FIG. 1 depicts a user equipment (UE) 12 connected to an Evolved Node B (eNodeB) 14. ENodeB 14 communicates with a Serving General packet radio service (GPRS) Support Node (SGSN) (in a 2G/3G network) or a Serving Gateway (SGW) 16 (in an LTE network). In a traditional packet core network, SGSN/SGW 16 is in direct communication with Gateway GPRS Serving Node (GGSN) (in a 2G/3G network) or Packet data network Gateway (PGW) 18 (in an LTE network). GGSN/PGW 18 is configured to communicate with a Domain Name System (DNS) Server 22 via a Firewall 20.

The network system depicted in FIG. 1 has a Packet Interceptor 26 positioned between SGSN/SGW 16 and GGSN/PGW 18. Packet Interceptor 26 introspects both the GPRS Tunneling Protocol control signaling (GTP-C) and GTP data (GTP-U) traffic between SGSN/SGW 16 and GGSN/PGW 18. Packet Interceptor 26 has the capability to introspect the GTP-C signaling, keep track of the GTP Session information, including the Tunnel Endpoint Identifier (TEID), SGSN/SGW IP, GGSN/PGW IP, International Mobile Subscriber Identity (IMSI), and Mobile Station International Subscriber Directory Number (MSISDN), which Packet Interceptor 26 can store into data store.

The network system further includes a PGW Data Server 28, which resides in a separate network with respect to GGSN/PGW 18. PGW Data Server 28 communicates with a Proxy Server 30. Proxy Server 30 connects to DNS Server 22 and to application servers 24. Proxy Server 30 is also connected to Content Storage 32 and Backend Processor and Service Portal 34. Content Storage 32 is used to store the content information, session data and packet handling statistic data, which can be used for multiple purposes, such as lawful query, traffic analytics or even as the feed to train the Filter Processor. The Filter Processor can be implemented with machine learning system and automatically update the filtering criteria to reduce the operational work. Filter Processor is one example of the Backend Processor 34. Another example of Backend Processor 34 is an analytic engine that monitors the content and generates real-time statistic reports to present the current system traffic status, health status, and system workload.

Figure 2A:
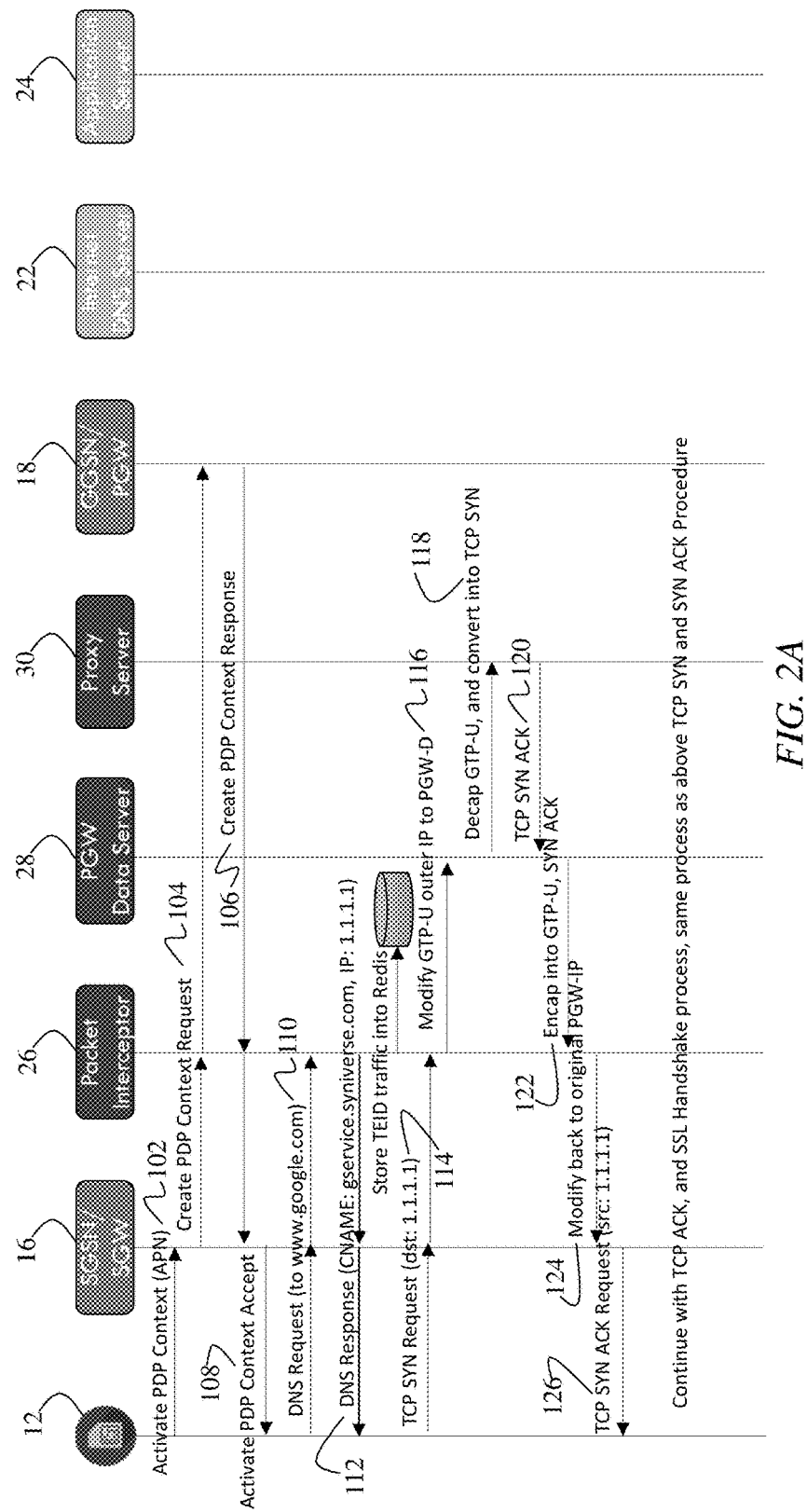
FIG. 2A is a sequential diagram schematically depicting a message flow of a first embodiment of the present invention.
Figure 2B:
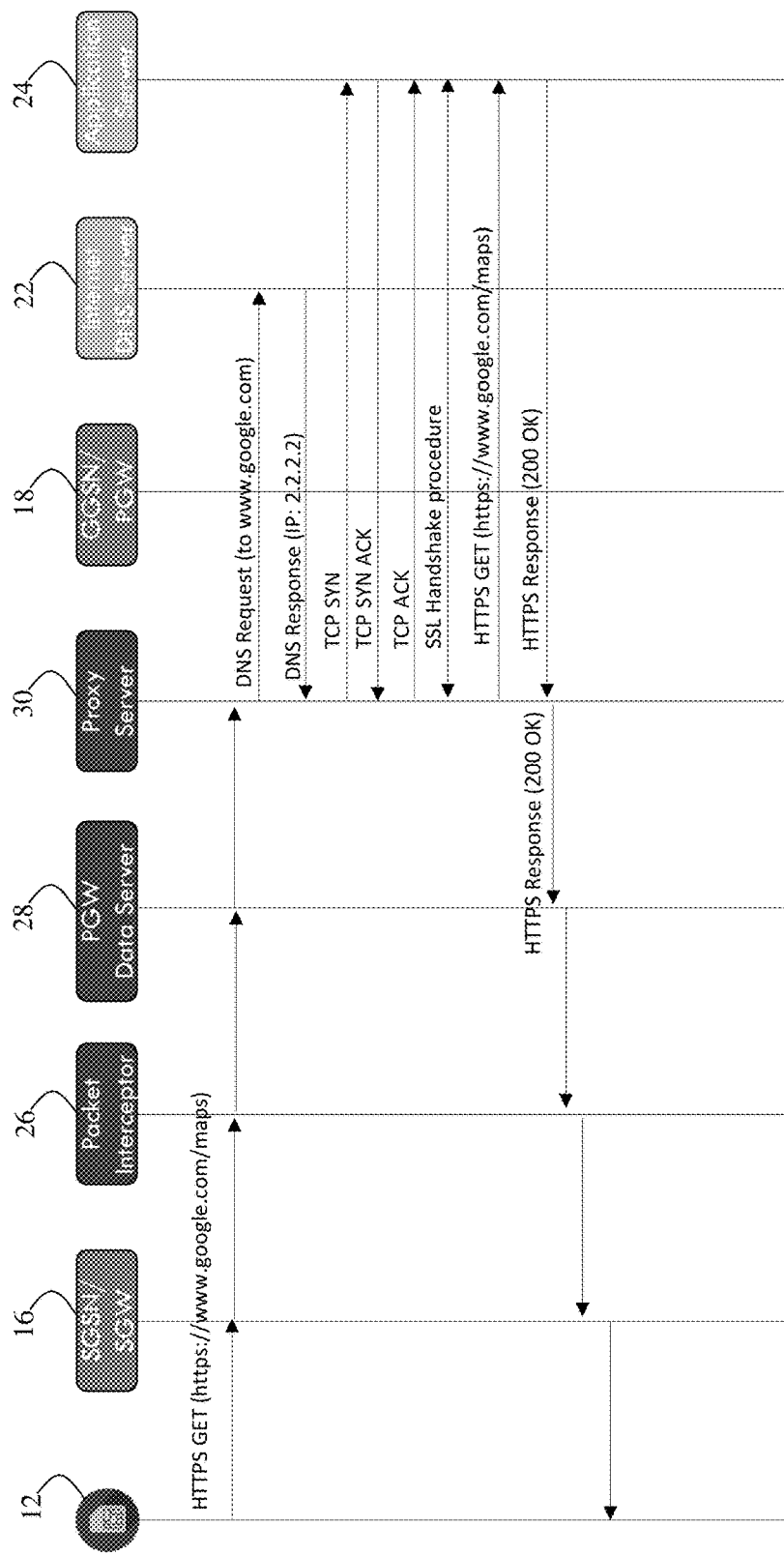
FIG. 2B is a sequential diagram schematically depicting the remaining message flow of the first embodiment depicted in FIG. 2A.

FIGS. 2A-B illustrates a message flow in an embodiment of the invention. In step 102, UE 12 sends an Activate PDP Context message toward SGSN/SGW 16, which then sends a Create PDP Context Request toward GGSN/PGW 18 in step 104. In step 106, GGSN/PGW 18 sends Create PDP Context Response toward SGSN/SGW 16. In step 108, SGSN/SGW 16 sends Activate PDP Context Accept message to UE 12. Packet Interceptor 26 accesses both the Create PDP Context Request and Response messages. From these GTP-C messages, Packet Interceptor 26 obtains GTP Session information, including the TEID of a GTP tunnel between SGSN/SGW 16 and GGSN/PGW 18, as well as their IP addresses, IMSI, and MSISDN of UE 12.

In step 110, UE 12 sends a GTP-U packet carrying a DNS request. Packet Interceptor 26 intercepts the GTP-U packet and introspects a DNS packet inside the GTP-U packet. If the DNS request is directed to a certain domain, such as clients4.google.com, Packet Interceptor 26 generates a DNS response which points to the IP address of Proxy Server 30, encapsulates response into corresponding GTP-U tunnel, then sends the generated GTP-U packet back to the SGSN/SGW 16 in step 112. Once UE 12 receives the DNS response, it initiates the network connection towards Proxy Server 30 in steps 116-126.

PGW Data Server 28 handles the GTP-U packets and performs the GTP-U tunnel decapsulate and ecapsulate functions in steps 118 and 122. Because the UE IP is originally assigned by GGSN/PGW 18, if there are multiple GGSNs/PGWs 18 serving for multiple UEs 12, it is possible that the UE IP can be duplicated when traffic from multiple UEs 12 needs to be handled by PGW Data Server 28. Thus, prior to decapsulating the GTP-U packet, PGW Data Server 28 reassigns a local subnet IP address to each UE 12. By assigning local subnet IP addresses, the network eliminates potential conflicts for different UEs 12. PGW Data Server 28 maintains the mapping of actual UE IP addresses assigned by GGSN/PGW 18 and the newly allocated local subnet UE IP addresses.

In step 118, when PGW Data Server 28 performs decapsulation from GTP-U packets into IP packets for upstream data packets—i.e., data packets sent from UE 12 to application server 24—PGW Data Server 28 changes the GTP-U inner source IP address to the new local subnet UE IP address. Likewise, in step 122, when PGW Data Server 28 performs encapsulation from IP packets into GTP-U packets for the downstream data packets—i.e., data packets sent from application servers 24 to UE 12—PGW Data Server 28 changes the destination IP address to be the original UE IP address assigned by GGSN/PGW 18, and then encapsulates the IP packets into GTP-U packets.

In an embodiment depicted in FIGS. 2A-B, Proxy Server 30 functions as an application-aware relay server. In this embodiment, Proxy Server 30 acts as the real application server towards the mobile device: Proxy Server 30 accepts TCP connections, SSL handshakes as well as the HTTP/HTTPS requests, holds the connection, initiates a new HTTP/HTTPS request toward application server 24, and upon receiving the response packets, carries the response backs to the original connection, which then arrives at UE 12. One exemplary message flow according to this embodiment is shown in FIG. 2A and the sub sequential flow in FIG. 2B. An advantage of this embodiment is that Proxy Server 30 is able to keep track of the request contents, especially the Request URLs, even when the connection between Proxy Server 30 and UE 12 or the connection between Proxy Server 30 and application server 24 uses encrypted HTTPS protocol. Thus, Proxy Server 30 can further enforce content filtering function to allow or deny the access to certain URLs.

Figure 3:
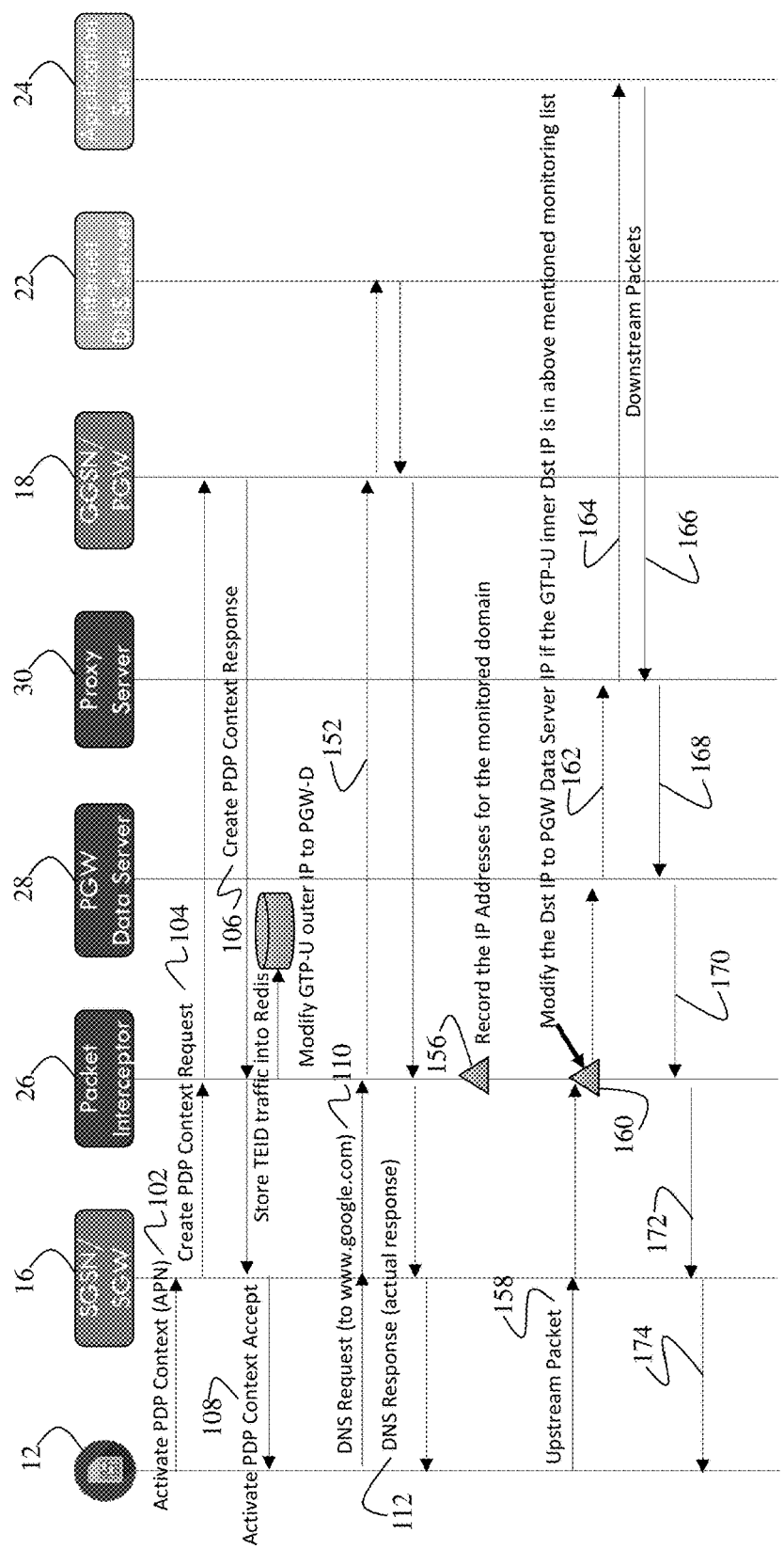
FIG. 3 is a sequential diagram schematically depicting a message flow of a second embodiment of the present invention.

In another embodiment, depicted in FIG. 3, Proxy Server 30 functions as a packet proxy server. This embodiment differs from the embodiment of FIGS. 2A-B discussed above, in that, in step 152, Packet Interceptor 26 sends DNS Request message received from UE 12 to DNS Server 22. DNS Server 22 provides a DNS Response, which Packet Interceptor 26 sends toward UE 12 in step 154. In step 156, Packet Interceptor records IP address for the monitored domain. Subsequently, when Packet Interceptor receives an upstream packet from UE 12 in step 158, Packet Interceptor queries the IP records to determine whether the upstream GTP-U packet is being sent toward a monitored IP address. If the destination IP address in the GTP-U packet is on the monitored list, then Packet Interceptor 26 modifies the destination IP of the GTP-U packet to the IP address of PGW Data Server 28 in step 160. PGW Data Server 28 decapsulates the GTP-U packet into an IP packet and sends it toward Proxy Server 30 in step 162. Proxy Server 30 sends the IP packet to Application Server 24 in step 164 and receives a downstream IP packet from Application Server 24 in step 166. In step 168, Proxy Server 30 sends the downstream IP packet to PGW Data Server 28, which encapsulates the downstream IP packet into the appropriate GTP-U tunnel and sends the resultant GTP-U packet toward Packet Interceptor 26 in step 170. Packet Interceptor 26 sends the GTP-U packet to SGSN/SGW 16 in step 172. In step 174, SGSN/SGW 16 delivers the downstream packet to UE 12. In this embodiment, Proxy Server 30 relays the packets exchange between UE 12 and application server 24.

Figure 4A:
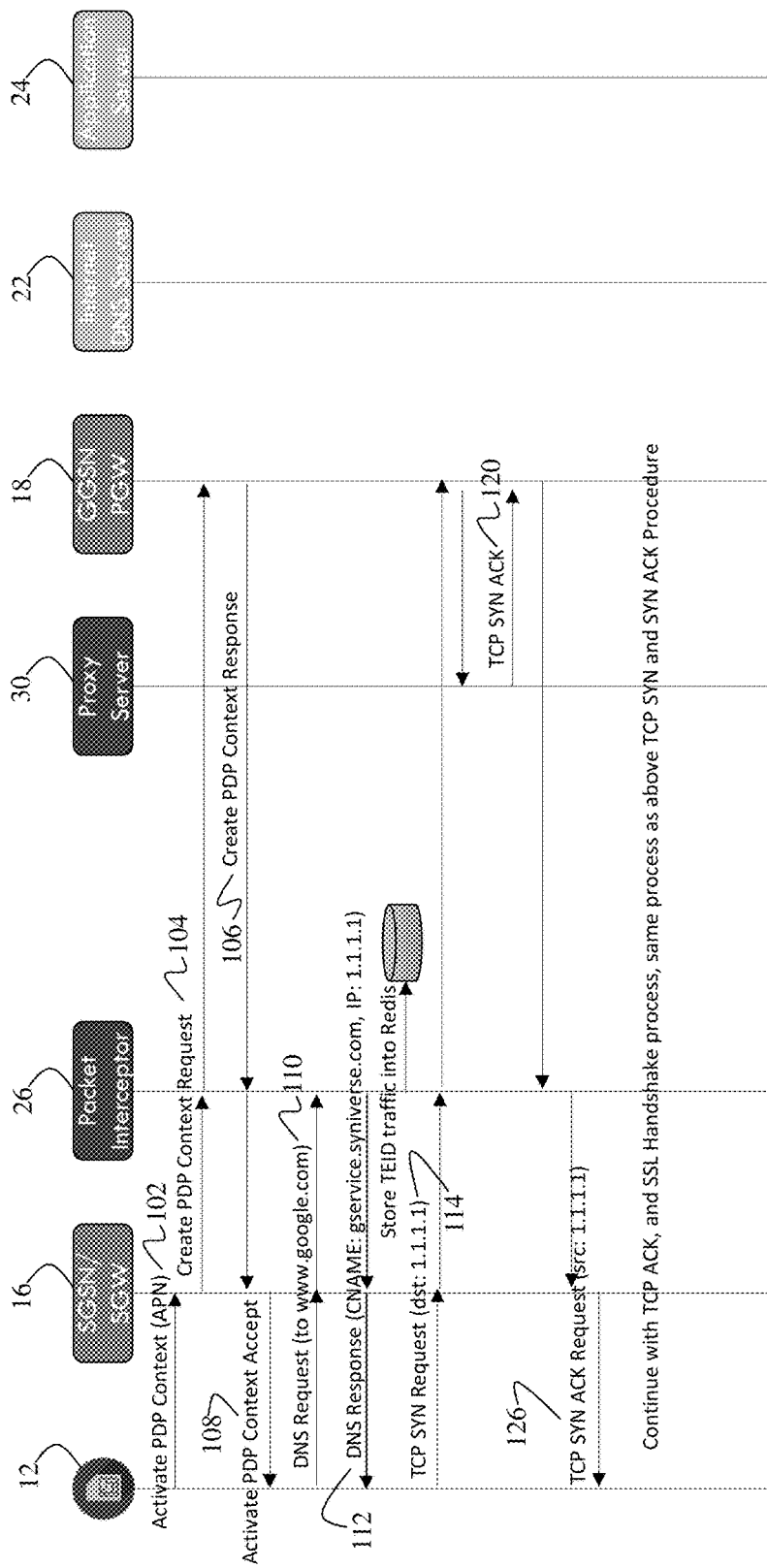
FIG. 4A is a sequential diagram schematically depicting a message flow of a third embodiment of the present invention.
Figure 4B:
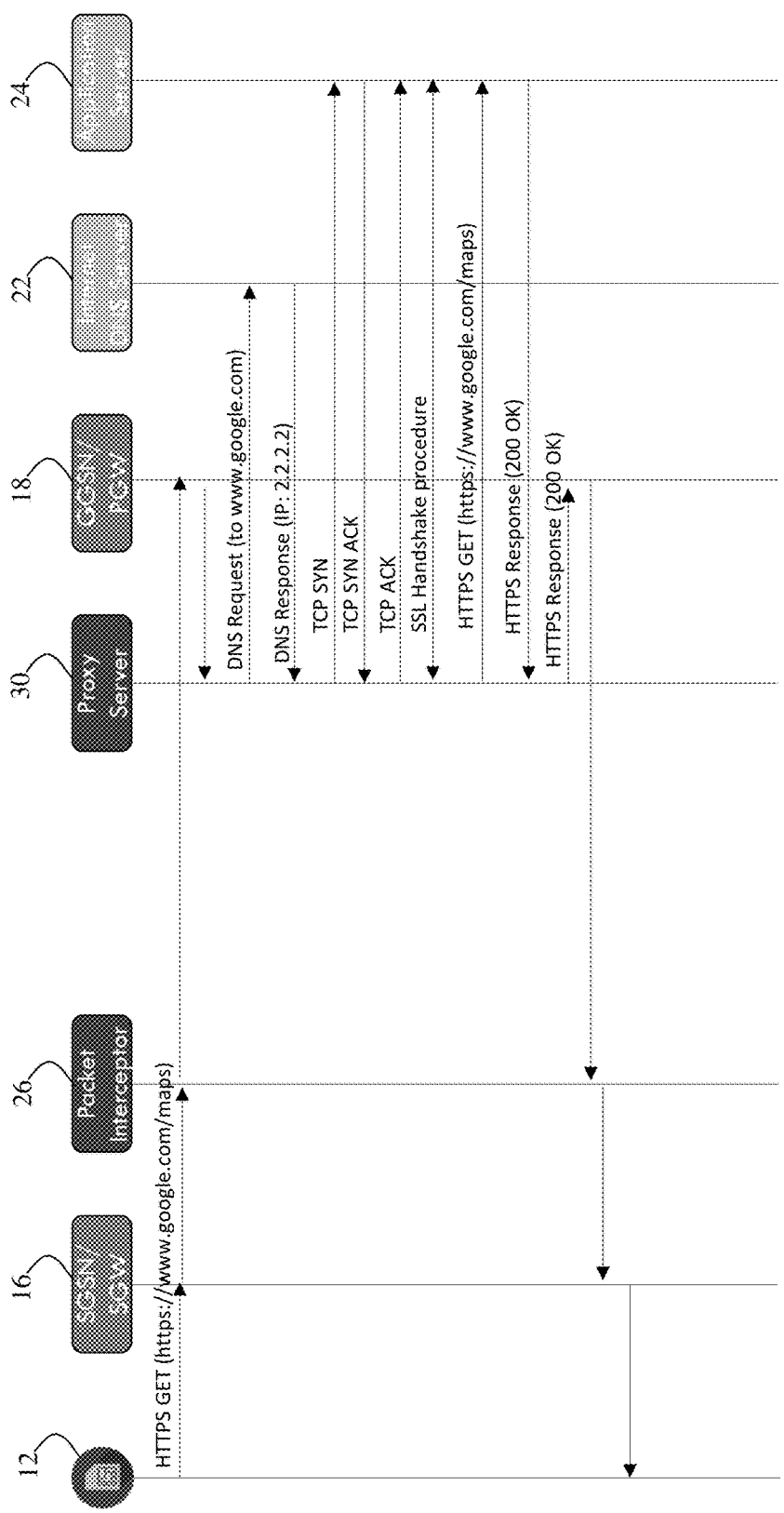
FIG. 4B is a sequential diagram schematically depicting the remaining message flow of the third embodiment depicted in FIG. 4A.

In another embodiment, depicted in FIG. 4, the data path is maintained through GGSN/PGW 18, and PGW Data Server 28 may be eliminated. In this embodiment, the IP addresses of application servers 24 are superseded with IP address of Proxy Server 30. This substitution of IP addresses is executed during the DNS query process in step 112. As FIG. 4 illustrates, packets sent out from UE 12 arrive at Proxy Server 30 first, and then, Proxy Server 30 acts as an application-aware relay server and handles the incoming packets as described in above. One exemplary message flow is shown in the FIG. 4A and the sub-sequential flows in FIG. 4B. For this embodiment, additional packet manipulation can be implemented to further enhance the security and avoid being blocked by existing firewall 20.

Figure 5:
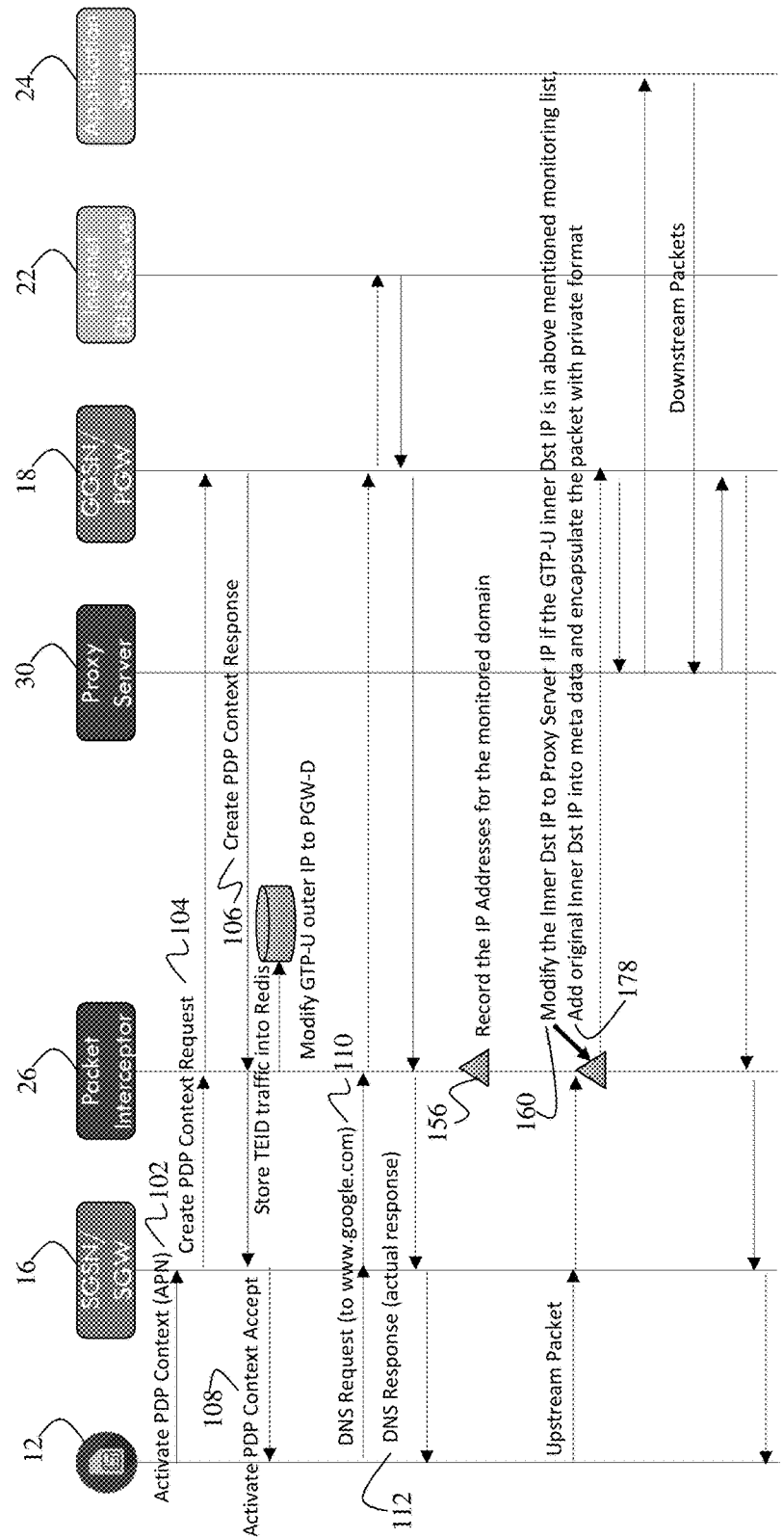
FIG. 5 is a sequential diagram schematically depicting a message flow of a fourth embodiment of the present invention.

In another embodiment, depicted in FIG. 5, the data path is maintained through GGSN/PGW 18. Proxy Server 30 functions as packet proxy server. However, in step 178, the original Inner Destination IP address is added into meta data to encapsulate the packet with private format when Packet Interceptor 30 sends the packet to GGSN/PGW 18. Thus, Proxy Server 30 is able to receive the packet, decrypt the content, and retrieve the original Destination Application Server IP address, and send the original packet towards destination application server 24.

Figure 8:
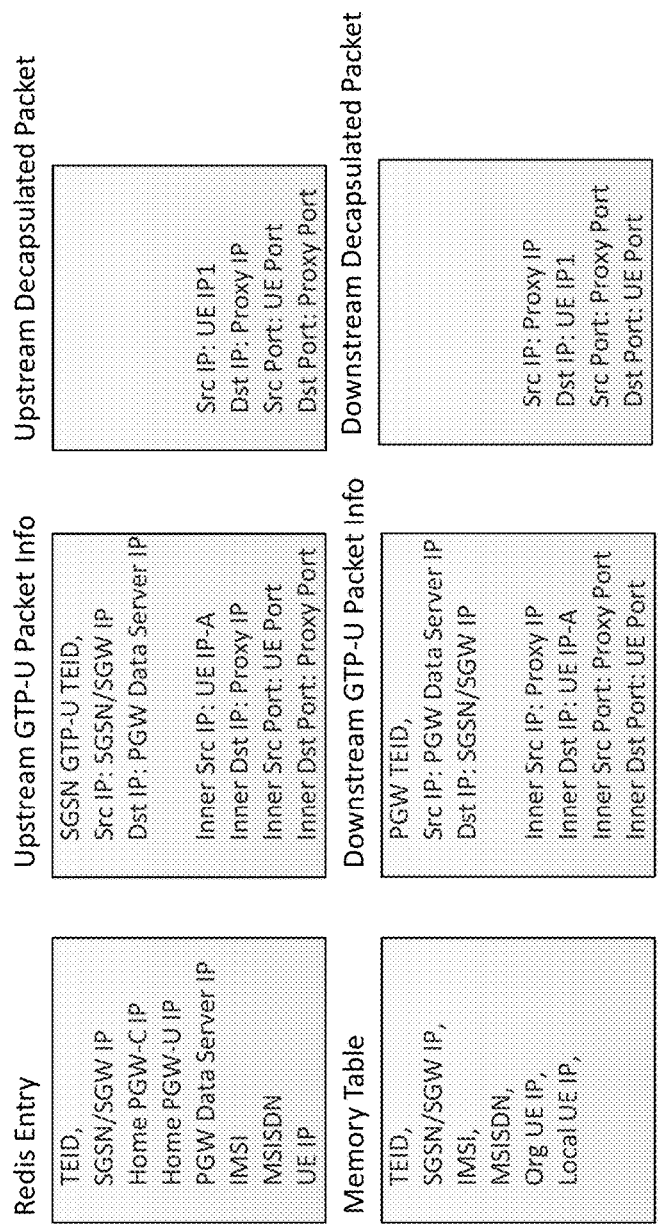
FIG. 8 is a block diagram depicting the data structures used by the system for both the Packet Interceptor and the PGW Data Server in the present invention.

FIG. 8 depicts exemplary DNS response message. On the right, FIG. 6 shows an example of a DNS response message 42 that is generated in prior art networks, while on the left, FIG. 8 depicts and exemplary DNS response 44 generated by the present invention. In this manner, FIG. 6 illustrates some of the differences of DNS response message between the original one and the one generated in the present invention.

Figure 7:
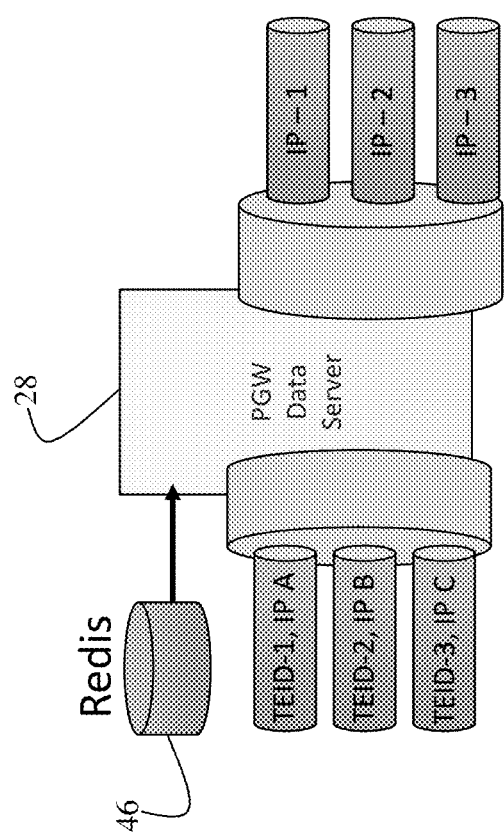
FIG. 7 is a block diagram depicting the PGW Data Server handling of the Tunnel IP address between GTP-U packets and decapsulated packets.

FIG. 7 schematically illustrates PGW Data Server 28 handling of the Tunnel IP address between GTP-U packets and decapsulated packets. PGW Data Server 28 maintains the mapping of actual UE IP address assigned by GGSN/PGW 18 and the newly allocated local subnet UE IP address. Using data session information stored in Redis 46, PGW Data Server can decapsulate GTP-U packets into IP packets and encapsulate IP packets into GTP-U packets. FIG. 8 is a block diagram depicting the data structures used for both Packet Interceptor 26 and PGW Data Server 28.

Figure 9:
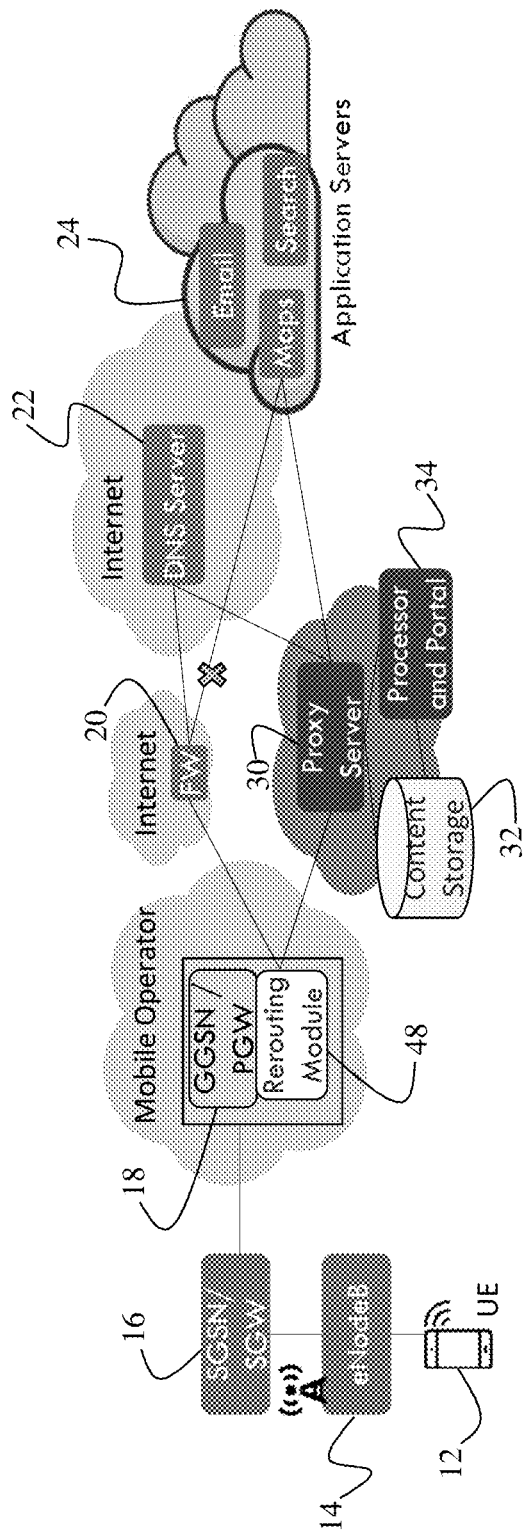
FIG. 9 is a block diagram schematically depicting an alternative system architecture of an embodiment of the present invention.

FIG. 9 illustrates an alternative embodiment of the network system. In this embodiment, the traffic rerouting function is implemented either inside GGSN/PGW 18 or as a separated module besides the GGSN/PGW 18. A Rerouting Module 48 monitors the DNS response messages and records the IP addresses returned in the DNS response for the specific domain. When incoming packets destined to those monitored IP addresses are received, Rerouting Module 48 either manipulates the packet and routes it to a separated network, or routes the packet to a separated network first, and then equipment in the separated network further manipulates the packets and routes it to Proxy Server 30 for further processing in the similar way as described in the aforementioned embodiments. Exemplary packet manipulation methods include, but not limited to, modification of the IP addresses, encryption and decryption of the packets, add and remove tunnel headers to include necessary attributes.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed:
1. A method of routing traffic in a packet core network comprising:
setting up a data session between a Serving General Packet Radio Service Serving (GPRS) Node (SGSN) and a Gateway GPRS Serving Node (GGSN) or a Serving Gateway (S-GW) and a Packet Data Network Gateway (P-GW), wherein a GPRS Tunneling Protocol data (GTP-U) tunnel is established between the SGSN and the GGSN or the SGW and the PGW;
accessing a GPRS Tunneling Protocol Control signaling (GTP-C) message sent between the SGSN and GGSN or the S-GW and the PGW;
obtaining a Tunnel Endpoint Identifier (TEID) for the GTP-U tunnel between the SGSN and the GGSN or the SGW and the PGW;
intercepting an upstream GTP-U packet sent from the SGSN toward the GGSN or from the SGW toward the PGW, the GTP-U packet being encapsulated into the GTP-U tunnel having the TEID;
rerouting the intercepted upstream GTP-U packet toward a server, the server configured to decapsulate the intercepted upstream GTP-U packet;
decapsulating the upstream GTP-U packet into an upstream Internet Protocol (IP) packet;
sending the upstream IP packet to a Proxy Server, the Proxy Server configured t perform message filtering functions;
examining the upstream IP packet and, responsive to the IP packet satisfying a predefined criterion, sending the upstream IP packet to a destination application server;
receiving a downstream IP packet from destination application server in response to the upstream IP packet;
encapsulating the downstream IP packet into a downstream GTP-U packet, wherein the downstream GTP-U packet is encapsulated into the GTP-U tunnel having the TEID; and
sending the downstream GTP-U packet toward the SGSN or the SGW.

2. The method of claim 1, wherein the Proxy Server filters GTP-U traffic.

3. The method of claim 1, further comprising the step of assigning a local subnet IP address to a User Equipment (UE) and replacing, within the upstream IP packet, an UE IP address assigned by the GGSN or the PGW with the local subnet IP address, prior to sending the upstream IP packet to the Proxy Server or the destination application server.

4. The method of claim 3, further comprising the step of replacing, within the downstream IP packet, the local subnet IP address assigned to the UE with the UE IP address assigned by the GGSN or the PGW, prior to sending the downstream IP packet to the SGSN or the SGW.

5. The method of claim 4, wherein a PGW Data Server maintains mapping of the UE IP address assigned by the GGSN and the local subnet IP address.

6. The method of claim 1, wherein a Packet Interceptor node performs the steps of accessing the GTP-C message and intercepting the GTP-U message, the Packet Interceptor node being in communication with the SGSN and the GGSN or the SGW and the PGW.

7. The method of claim 1, wherein the GTP-U message contains a DNS packet directed toward a domain and, wherein, a Packet Interceptor node is configured to intercept the GTP-U message and to send a DNS response toward the SGSN or the SGW, the DNS response pointing to the Proxy Server.

8. The method of claim 1, wherein the Proxy Server functions as a relay server, whereby the Proxy Server is configured to execute the steps comprising:
accepting a Transmission Control Protocol (TCP) connection, a Secure Socket Layer (SSL) handshake, a Hyper Text Transfer Protocol (HTTP) request, or a HTTP Secure (HTTPS) request;
initiating a new HTTP or a new HTTPS request toward the destination application servers; and responsive to receiving the downstream IP message from the destination application server, sending the downstream IP message toward the SGSN or the SGW.

9. The method of claim 1, wherein content information of the upstream IP message, session data, or packet handling statistic data is stored within a Content Storage.

10. The method of claim 1, wherein an IP address of the destination application server is superseded with an IP address of the Proxy Server, and wherein, responsive to receiving the upstream IP message, the Proxy Server relays the upstream IP message to the GGSN or the PGW.

11. A system of routing traffic in a packet core network having a Serving General Packet Radio Service Serving (GPRS) Node (SGSN) and a Gateway GPRS Serving Node (GGSN) or a Serving Gateway (S-GW) and a Packet Data Network Gateway (P-GW), comprising:
  a Packet Interceptor configured to execute the steps comprising:
    accessing a GPRS Tunneling Protocol Control signaling (GTP-C) message sent between the SGSN and the GGSN or the S-GW and the PGW;
    obtaining a Tunnel Endpoint Identifier (TED) for the GTP-U tunnel between the SGSN and the GGSN or the SGW and the PGW; and
    intercepting an upstream GPRS Tunneling Protocol data (GTP-U) packet sent from the SGSN toward the GGSN or from the SGW toward the PGW, the GTP-U packet being encapsulated into the GTP-U tunnel having the TEID;
  a PGW Data Server configured to execute the steps comprising:
    decapsulating the upstream GTP-U packet into an upstream Internet Protocol (IP) packet;
    sending the upstream IP packet to a Proxy Server;
    receiving a downstream IP packet from the Proxy Server in response to the upstream IP packet;
    encapsulating the downstream IP packet into a downstream GTP-U packet, wherein the downstream GTP-U packet is encapsulated into the GTP-U tunnel having the TEID; and
    sending the downstream GTP-U packet toward the SGSN or the SGW;
  the Proxy Server in communication with a Domain Name System (DNS) server and a destination application server, the Proxy Server configured to execute steps comprising:
    examining the upstream IP packet and, responsive to the upstream IP packets satisfying a predefined criterion, forwarding the upstream IP packet tot the destination server.

12. The system of claim 11, the PGW Data server assigns a local subnet IP address to a User Equipment (UE) and replaces, within the upstream IP packet, an UE IP address assigned by the GGSN or the PGW with the local subnet IP address, prior to sending the upstream IP packet to the Proxy Server or the destination application server.

13. The method of claim 12, wherein the PGW Data Server replaces, within the downstream IP packet, the local subnet IP address assigned to the UE with the UE IP address assigned by the GGSN or the PGW, prior to sending the downstream IP packet to the SGSN or the SGW.

14. The method of claim 12, wherein the PGW Data Server maintains mapping of the UE IP address assigned by the GGSN and the local subnet IP address.

15. The system of claim 11, wherein the GTP-U message contains a DNS packet directed toward a domain and, wherein, the Packet Interceptor node is configured to intercept the GTP-U message and to send a DNS response toward the SGSN or the SGW, the DNS response pointing to the Proxy Server.

16. The system of claim 11, wherein the Proxy Server functions as a relay server, whereby the Proxy Server is configured to execute the steps comprising:
  accepting a Transmission Control Protocol (TCP) connection, a Secure Socket Layer (SSL) handshake, a Hyper Text Transfer Protocol (HTTP) request, or a HTTP Secure (HTTPS) request;
  initiating a new HTTP or a new HTTPS request toward the destination application servers; and
  responsive to receiving the downstream IP message from the destination application server, sending the downstream IP message toward the SGSN or the SGW.

17. The system of claim 11, wherein content information of the upstream IP message, session data, or packet handling statistic data is stored within a Content Storage.

18. The system of claim 11, wherein an IP address of the destination application server is superseded with an IP address of the Proxy Server, and wherein, responsive to receiving the upstream IP message, the Proxy Server relays the upstream IP message to the GGSN or the PGW.

* * * * *